(12) United States Patent
Oike

(10) Patent No.: US 8,302,619 B2
(45) Date of Patent: Nov. 6, 2012

(54) FLOAT VALVE APPARATUS AND ITS CLEANING METHOD

(75) Inventor: Tadashi Oike, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 473 days.

(21) Appl. No.: 12/528,755

(22) PCT Filed: Mar. 6, 2007

(86) PCT No.: PCT/JP2007/054252
§ 371 (c)(1),
(2), (4) Date: Aug. 26, 2009

(87) PCT Pub. No.: WO2008/107967
PCT Pub. Date: Sep. 12, 2008

(65) Prior Publication Data
US 2010/0126591 A1    May 27, 2010

(51) Int. Cl.
*F16K 3/36* (2006.01)
(52) U.S. Cl. ............. 137/245.5; 137/192; 251/122; 236/93 R
(58) Field of Classification Search ............ 137/15.01, 137/15.07, 192, 204, 244, 245.5; 251/122; 236/93 R, 101, 102
See application file for complete search history.

(56) References Cited

U.S. PATENT DOCUMENTS

| | | | | |
|---|---|---|---|---|
| 1,163,316 A | * | 12/1915 | Brown | 137/175 |
| 1,406,747 A | * | 2/1922 | Massip | 137/177 |
| 1,448,972 A | * | 3/1923 | Long | 137/192 |
| 1,897,753 A | * | 2/1933 | Cryer | 236/53 |
| 2,778,375 A | * | 1/1957 | Hans-Martin Pape et al. | 137/244 |

(Continued)

FOREIGN PATENT DOCUMENTS
JP     4936747     10/1974
(Continued)

*Primary Examiner* — John Rivell
*Assistant Examiner* — Matthew W Jellett
(74) *Attorney, Agent, or Firm* — The Webb Law Firm

(57) ABSTRACT

A foreign object in a discharge path defined and formed in a valve case is effectively removed. In a float valve apparatus T including a valve chamber 2 for receiving gas A and liquid W through an inlet pipe 1, a discharge path 4 communicating with a discharge pipe 3, a valve case 5 defining and forming therein the valve chamber 2 and the discharge path 4, a valve opening 6a for opening the discharge path 4 to the valve chamber 2, opening/closing means for opening/closing the valve opening 6a in association with a movement of a float member 7 floating in an amount of liquid W received in the valve chamber 2 and a foreign object removing member 8 for removing a foreign object in the discharge path 4 in association with an advancing movement of the foreign object removing member toward the valve opening 6a in the discharge path 4, the foreign object removing member 8 being movable to advance/retract in the discharge path 4 in response to an operation from outside the valve case 5, the foreign object removing member 8 is caused to advance in the discharge path 4 to penetrate the valve opening 6a, in response to a threading-in operation of the foreign object removing member 8 to a threaded portion 10a formed in the valve case 5.

11 Claims, 6 Drawing Sheets

U.S. PATENT DOCUMENTS

| | | | | |
|---|---|---|---|---|
| 3,489,348 A | * | 1/1970 | Fujiwara | 236/53 |
| 3,785,555 A | * | 1/1974 | Fujiwara | 236/53 |
| 4,300,588 A | * | 11/1981 | Fujiwara et al. | 137/185 |
| 4,408,626 A | * | 10/1983 | Fujiwara | 137/185 |
| 4,522,222 A | * | 6/1985 | Carey, Jr. | 137/240 |
| 4,629,120 A | * | 12/1986 | Diamond | 239/117 |
| 4,809,736 A | * | 3/1989 | Oike et al. | 137/489.5 |
| 4,867,767 A | * | 9/1989 | Yokoyama | 96/409 |
| 5,186,203 A | * | 2/1993 | Oike | 137/192 |
| 5,287,878 A | * | 2/1994 | Oike | 137/194 |
| 5,884,654 A | * | 3/1999 | Oike | 137/177 |
| 5,934,881 A | * | 8/1999 | Yumoto | 417/133 |

FOREIGN PATENT DOCUMENTS

| | | |
|---|---|---|
| JP | 63201298 U | 12/1988 |
| JP | 2005061524 A | 3/2005 |

* cited by examiner

FLOAT VALVE APPARATUS AND ITS CLEANING METHOD

TECHNICAL FIELD

The present invention relates to a float valve apparatus for use as e.g. a steam trap for discharging condensed water from a steam system or an air trap for discharging condensed water from compressed air system.

More particularly, the invention relates to a float valve apparatus including a valve chamber for receiving gas and liquid through an inlet pipe, a discharge path communicating with a discharge pipe, a valve chamber defining and forming therein the valve chamber and the discharge path, a valve opening for opening the discharge path to the valve chamber, opening/closing means for opening/closing the valve opening in association with a movement of a float member floating in an amount of liquid received in the valve chamber, and a foreign object removing member for removing a foreign object in the discharge path in association with an advancing movement of the foreign object removing member toward the valve opening in the discharge path, said foreign object removing member being movable to advance/retract in the discharge path in response to an operation from outside said valve case.

BACKGROUND ART

With this type of float valve apparatus, for introducing gas and liquid into the valve chamber through the inlet pipe, of the liquid and the gas, the liquid is selectively discharged from the valve chamber through the discharge path, in association with opening/closing of the valve opening by the opening/closing means.

This float valve apparatus includes a foreign object removing member that moves forwardly in the discharge path toward the valve opening so as to remove a foreign object in the discharge path. This foreign object removing member is movable rearward by an operation from the outside of the valve case, thus facilitating a foreign object removing operation when a foreign object becomes stuck or adheres within the discharge path in the course of discharging of the liquid from the valve chamber.

FIG. 10 shows a conventional construction of this type of float valve apparatus (see Patent Document 1 below). Within the valve chamber 2, there is incorporated a float type valve body 7 as an example of the opening/closing means. In operation, as this float valve body 7 is seated on or detached from a valve seat forming the valve opening 6a, in association with movements of the float member as floating in the liquid introduced into the valve chamber 2, so that the valve body functions as a valve opening opening/closing portion at its outer surface to close/open the valve opening 6a. The foreign object removing member 8 is inserted in sliding contact to an insertion hole 5a formed in a wall portion of the valve case 5. Further, at an intermediate portion of the foreign object removing member 8, there is formed a retraction stopper 8e in the form of a flange. This retraction stopper 8e comes into contact with an outer peripheral edge of the insertion hole 5a in the inner face of the wall portion of the valve case 5, thereby to restrict a retracting movement of the foreign object removing member 8. Further, at a rear end of the foreign object removing member 8, there is formed a spring receiving portion 8f. And, between this spring receiving portion 8f and the wall outer face of the valve case 5, there is incorporated a compression spring 18.

With this float valve apparatus, by an urging force provided by the compression coil spring 18, the foreign object removing member 8 is urgedly retained at a retracted position where the movement of the member is restricted by the retraction stopper 8e. When an operator pushes the foreign object removing member 3 further into the insertion hole 5a formed in the valve case 5 against the urging force of the compression coil spring 18, the foreign object removing member 8 is moved forward or advanced in the discharge path 4 to extend through the valve opening 6a.

When a foreign object gets stuck in the discharge path 4, the operator will momentarily push the foreign object removing member 8 urged to the retracted position by the compression coil spring 18. With this, the foreign object removing member S is advanced to remove the foreign object in the discharge path 4. After the removal of the foreign object, under the urging force of the compression coil spring 18, the foreign object removing member 8 will be instantaneously returned to the retracted position. This is the conventional cleaning method for removing a foreign object in the discharge path 4.

Patent Document 1: Japanese Utility Model Published Sho. 49-36747

DISCLOSURE OF THE INVENTION

Problem To Be Solved by Invention

However, the conventional float valve apparatus and cleaning method for the float valve apparatus as described above have following problems.

When a foreign object having a large adhesive force or a foreign object having a large mass is to be removed from the discharge path, a very large pushing force is required for advancing the foreign object removing member with a large advancing force. Further, if the foreign object removing member is pushed with such a large pushing force, the foreign object removing member may hit at a high speed the opening/closing portion of the valve opening, so that this hitting impact can destroy the opening/closing means.

When the foreign object removing member has its retracting movement restricted by the retraction stopper, that is, when the foreign object removing member is located at the retracted position, liquid present inside the valve chamber is discharged to the discharge pipe through the discharge path. In the course of this, the discharged liquid to the discharge pipe will flow through a gap between the inner face of the wall portion of the valve case and the retraction stopper into the portion that the foreign object removing member penetrates. If this inflow liquid causes corrosion in the inner face of the portion penetrated by the foreign object removing member, this will cause inadvertent change in the advancing posture of the foreign object removing member, whereby the foreign object removing performance of the foreign object removing member is deteriorated.

When a foreign object is stuck within or adheres to the discharge path, due to this stuck foreign object, the discharge rate of the discharge path is reduced. In this case, it is conceivable that a certain amount of liquid has accumulated inside the valve chamber. And, with this accumulation of liquid inside the valve chamber, the foreign object removing member will be advanced to remove the stuck foreign object, then, the accumulated liquid inside the valve chamber will flow through the cleared discharge path. Thus, this passing liquid can remove any remaining foreign object in the discharge path. However, if the amount of the accumulated liquid is too small, this is not very effective for removal of remaining foreign object in the discharge path. Also, if the liquid accumulated in the valve chamber passes little by little through the gap between the foreign object removing member located at the advanced position and the valve opening, this also is not effective for the removal.

In view of the above, the principal object of the present invention is to provide a float valve apparatus and its cleaning method capable of effectively overcoming the above-described drawback, thus effectively carrying out foreign object removing operation for the discharge path.

Means For Solving Problem

The first characterizing feature of the present invention relates to a float valve apparatus.

The float valve apparatus comprises:

a valve chamber for receiving gas and liquid through an inlet pipe;

a discharge path communicating with a discharge pipe;

a valve case defining and forming therein said valve chamber and said discharge path;

a valve opening for opening said discharge path to said valve chamber;

opening/closing means for opening/closing said valve opening in association with a movement of a float member floating in an amount of liquid received in said valve chamber; and a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;

wherein said foreign object removing member is caused to advance in said discharge path to penetrate said valve opening, in response to a threading-in operation of the foreign object removing member to a threaded portion formed in said valve case.

According to the above characterizing construction, the advancing force required for causing the foreign object removing member to advance in the discharge patch can be effectively obtained at a low speed, by the threading-in operation thereof. Thus, it is possible to effectively prevent high-speed hitting of the foreign object removing member penetrating the valve opening and entering the valve chamber against the valve opening opening/closing portion. Hence, such inconvenience as damage or breakage of the opening/closing means due to the hitting impact can be avoided effectively. Further, as the foreign object removing member can be caused to advance with an extremely large advancing force, a foreign object having a large adhesive force relative to the discharge path or a foreign object having a large weight can be removed effectively. With this, the inventive construction, though simpler than the conventional construction, can carry out the foreign object removing operation to the discharge path in an effective manner.

According to a second characterizing feature of the present invention, a valve seat forming said valve opening is provided in said valve chamber; and said opening/closing means comprises an arrangement that said valve opening is opened/closed in association with detaching/seating of said float member as floating in liquid received in said valve chamber, from/to said valve seat.

According to the above characterizing construction, the opening/closing means for opening/closing the valve opening can be constructed as the simple construction that the valve opening is opened/closed by the outer surface of the float member. This opening/closing means closes the valve opening in the manner that the outer surface of the floating member is pressed against the valve seat by a relatively small force such as the weight of the float member or the buoyant force acting on the float member. Therefore, for ensuring the sealing precision of the valve opening, a high degree of smoothness is required for the outer surface of the float member. Therefore, the above-described damage preventive effect achieved by the first characterizing construction can be achieved particularly effectively.

According to a third characterizing construction of the present invention, a leading end of said foreign object removing member is rotatable by said threading-in operation.

According to the above characterizing construction, by rotating the leading end of the foreign object removing member with the threading-in operation, it is possible to apply, to the foreign object in the discharge path, an external force for removal in a direction different from the advancing direction of the foreign object removing member. Therefore, the foreign object removal for the discharge patch can be carried out in an even more effective manner.

According to a fourth characterizing construction of the present invention, the apparatus further comprises guiding means for guiding said foreign object removing member toward said valve opening.

According to the above characterizing construction, with the guiding means, the foreign object removing member can be caused to penetrate the valve opening in a reliable and easy manner. Thus, the foreign object removal for the discharge patch can be carried out in an even more effective manner.

According to a fifth characterizing construction of the present invention, when said foreign object removing member is located at a predetermined retracted position, an effective discharge path between an outer peripheral face of said foreign object removing member and an inner peripheral face of said discharge path has a path cross sectional area that is greater than the aperture area of said valve opening and that also is smaller than the diameter of said valve opening.

That is to say, if the path cross sectional area of the effective discharge path is greater than the aperture area of the valve opening, it is possible to ensure the maximum discharge rate available with the valve opening. Further, if the path width of the effective discharge path is smaller than the diameter of the valve opening, it is possible to prevent any foreign object larger than the diameter of the valve opening from entering the discharge path. Hence, it is possible to effectively avoid enlargement of the space required for the effective discharge path.

That is, according to the above-described characterizing construction, while the construction adopts provision of the foreign object removing member for removing a foreign object from the discharge path, it is possible to ensure sufficient discharge rate for the discharge path.

Incidentally, in embodying the above characterizing construction, it is advantageous to arrange the valve opening and the discharge path along a common axis. This is advantageous for effective removal of foreign object.

A sixth characterizing construction of the present invention relates to a float valve apparatus.

The float valve apparatus comprises:

a valve chamber for receiving gas and liquid through an inlet pipe;

a discharge path communicating with a discharge pipe;

a valve case defining and forming therein said valve chamber and said discharge path;

a valve opening for opening said discharge path to said valve chamber;

opening/closing means for opening/closing said valve opening in association with a movement of a float member floating in an amount of liquid received in said valve chamber; and a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;

wherein the float valve apparatus further comprises an advancement stopper for restricting an advancing movement of said foreign object removing member while closing said discharge path.

When a foreign object adheres to and gets stack in the discharge path, this adhesion of the foreign object results in reduction in the discharge rate of the discharge path. Under this condition, it is conceivable that a certain amount of liquid has accumulated inside the valve chamber. According to the above characterizing construction, the discharge path is closed under the condition where the advancement stopper restricts the advancing movement of the foreign object removing member, that is, after completion of the advancing movement. Thus, simultaneously with a retracting movement after completion of the advancing movement, the accumulated liquid inside the valve chamber will be caused to pass at once the discharge path, so that this passed liquid can effectively remove any foreign object which could not be removed by the advancing movement. As a result, the foreign object removal for the discharge path can be carried out more effectively than the conventional construction.

Moreover, a foreign object which has been removed and discharged into the valve chamber in association with the advancing movement of the foreign object removing member and/or a foreign object which adheres to the perimeter of the valve opening inside the valve chamber can also be effectively removed and discharged together with the accumulated liquid through the discharge path to the discharge pipe. Therefore, such inconvenience as deterioration in the valve performance due to adhesion of foreign object inside the valve chamber can also be prevented effectively.

According to a seventh characterizing feature of the present invention, said advancement stopper is configured to restrict the advancing movement of the foreign object removing member while closing the valve opening or a portion adjacent thereto.

According to the above characterizing construction, the valve opening or its adjacent portion is closed, with the advancement stopper restricting advancing movement of the foreign object removing member. Therefore, it is possible to cause the liquid in the valve chamber to pass the discharge path at one time from the maximally upstream side thereof, simultaneously with the retracting movement after completion of the advancing movement. With this liquid passage, it is possible to remove, over the maximally large area, any foreign object which could not be removed by the advancing movement. As a result, the foreign object removal for the discharge path can be effected in an even more effective manner.

According to an eighth characterizing construction of the present invention, said foreign object removing member is configured to penetrate said valve opening in association with an advancing movement thereof, and the apparatus further comprises a guiding means for guiding said foreign object removing member toward said valve opening.

According to the above characterizing construction, with the guiding means, the foreign object removing member can be caused to penetrate the valve opening in a reliable and smooth manner, so that the foreign object removal for the discharge path can be effected in an even more effective manner.

A ninth characterizing construction of the present invention relates to a float valve apparatus.

The float valve apparatus comprises:

a valve chamber for receiving gas and liquid through an inlet pipe;

a discharge path communicating with a discharge pipe;

a valve case defining and forming therein said valve chamber and said discharge path;

a valve opening for opening said discharge path to said valve chamber;

opening/closing means for opening/closing said valve opening in association with a movement of a float member floating in an amount of liquid received in said valve chamber; and a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;

wherein the float valve apparatus further comprises a retraction stopper for restricting a retracting movement of said foreign object removing member while closing a portion of the wall portion of the valve case penetrated by the foreign object removing member.

When the retracting movement of the foreign object removing member is restricted by the retraction stopper, liquid present inside the valve chamber will be discharged through the discharge path into the discharge pipe. According to this characterizing construction, while the retraction stopper restricts retracting movement of the foreign object removing member, the retraction stopper closes the portion of the wall portion of the valve case penetrated by the foreign object removing member. With this, the foreign object removal for the discharge path can be effected more effectively than the conventional construction.

According to a tenth characterizing construction of the present invention, said retraction stopper functions also as an advancement stopper for restricting advancing movement of the foreign object removing member located at a predetermined advanced position after the foreign object removing member has been moved to this advanced position.

According to the above characterizing construction, the construction can be simplified, as compared with a case of providing the advancement stopper as a member separate from the retraction stopper. Hence, reduction in the manufacturing cost and maintenance cost can be achieved effectively.

An eleventh characterizing construction of the present invention relates to a method of cleaning a float valve apparatus.

The cleaning method comprises the steps of:

defining and forming, in a valve case, a valve chamber for receiving gas and liquid through an inlet pipe and a discharge path communicating with a discharge pipe;

forming a valve opening for opening said discharge path to said valve chamber;

providing opening/closing means for opening/closing said valve opening in association with a movement of a float member floating in an amount of liquid received in said valve chamber; and providing a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;

wherein the method comprises;

advancing said foreign object removing member to constrict or close said discharge path;

allowing liquid to be received and reserved within the valve chamber by keeping said foreign object removing member standby under the above condition; and subsequently extending or opening said discharge path by retracting said foreign object removing member, thereby to allow the liquid reserved in the valve chamber to pass the discharge path.

According to the above characterizing construction, by releasing an amount of liquid accumulated and reserved in the valve chamber by making the foreign object removing member standby at its advanced position, this amount of liquid is caused to past through the discharge path. With this liquid passage, any foreign object which was not removed or not completely removed by the advancing movement of the foreign object removing member can now be removed effectively, so that the foreign object removal for the discharge path can be carried out more effectively than the conventional cleaning method described above.

Moreover, a foreign object which has been removed and discharged into the valve chamber with the advancing movement of the foreign object removing member and/or a foreign object which adheres to the perimeter of the valve opening inside the valve chamber too can be effectively discharged together with the accumulated liquid into the discharge pipe through the discharge path. As a result, it is possible to prevent adherence of foreign object inside the valve chamber, thus effectively avoiding such inconvenience as deterioration in the valve performance.

BEST MODE OF EMBODYING INVENTION

FIGS. 1-4 show a free float type steam trap T configured to selectively discharge condensed water (steam condensate) W from a steam system including steam A (an example of gas) and the condensed water W (an example of liquid). This steam trap T includes a valve chamber 2 receiving the steam A and the condensed water W through an inlet pipe 1, and a discharge path 4 communicating the valve chamber 2 with a discharge pipe 3, the valve chamber 2 and the discharge path 4 being defined and formed in a valve case 5 made of metal.

The discharge path 4 is open to the valve chamber 2 at a valve opening 6a. This valve opening 6a is formed at a center portion of a cylindrical valve seat 6 provided in the valve chamber 2. The valve chamber 2 accommodates therein a float type valve body 7 made of metal as an example of "float member". This float type valve body 7 is afloat in the condensed water W to be movable to be detached from or seated onto the valve seat 6, thereby to open/close the valve opening 6a. That is to say, the float type valve body 7 constitutes "opening/closing means" for opening/closing the valve opening 6a as being movable as being afloat in the condensed water W flown into the valve chamber 2.

In the wall portion of the valve case 5, there is provided a foreign object removing member 8 provided as a substantially round-bar like metal member, the removing member 8 being capable of advancing in the discharge path 4 toward the valve opening 6a to discharge any foreign object in the discharge path 4. This foreign object removing member 8 is movable to an advanced position (the position shown in FIG. 3) and a retracted position (the position shown in FIGS. 1 and 2).

The valve case 5 comprises a gas-tight integrated assembly of a case main member 9 approximately in the form of a deep pan and a case lid member 11 approximately in the form of a shallow bawl, with opening edges thereof being in abutment with each other, also with an upper partitioning wall 9c of the case main member 9 and a lower partitioning wall 11a of the case lid member 11 being in abutment with each other in a gas-tight manner by means of a bolt 12.

The case main member 9 forms an inlet pipe connecting opening 9a for the inlet pipe 1 and a discharge pipe connecting opening 9b for the discharge pipe 3. The wall portion of the case lid member 11 defines therethrough a threaded hole 11b, in which there is threaded a cylindrical holder member 10 having a threaded hole 10a (an example of a "threaded portion") in which the foreign object removing member 8 can be threaded.

The valve seat 6 is formed through a lower portion of a lower partitioning wall 11a of the case lid member 11, with the valve opening 6a facing the side of the valve chamber 2 and an axis of a cylindrical hole 4A being in alignment with a common axis P of the threaded hole 10a for the foreign object removing member.

That is to say, the lower partitioning wall 11a forming the valve seat 6 as a threaded portion therein and the upper partitioning wall 9c together partition the inside of the valve case 5 between the valve chamber 2 communicating the inlet pipe connecting opening 9a with the valve opening 6a and the discharge path 4 communicating the valve opening 6a with the discharge pipe connecting opening 9b.

Incidentally, numeral 13 denotes a strainer stretchedly attached to the case main member 9 for preventing intrusion of a foreign object into the valve chamber 2.

The float valve body 7 is constructed as a hollow spherical body. When this float valve body 7 is afloat in condensed water W inside the valve chamber 2, that is, under its floating condition where the valve body 7 can rotate about is own axis being unfixed, the valve body 7 is lowered in association with lowering of the condensed water level inside the valve chamber 2 to be seated on the valve seat 6 (the condition denoted with the solid line in FIG. 1) and is elevated in association with elevation of the condensed water level inside the valve chamber 2 to be detached from the valve seat 6 (the condition shown by the dotted line in FIG. 1).

Inside the valve chamber 2, there is provided a bimetal 14. When the valve chamber 2 has a high temperature (i.e. when steam A and condensed water W flows therein), the bimetal 14 assumes a constricted bent state illustrated in FIG. 1 where the leading end of the bimetal is not in contact with the float valve body 7 under its seated state, thereby to allow the seating of the float valve body 7 on the valve seat 6. On the other hand, when low temperature air and/or low temperature water flow(s) into the valve chamber 2 so that the inside of the valve chamber 2 has a low temperature, the bimetal 14 assumes an extended bent state where the leading end of the bimetal pushes up the seated float valve body 7, thereby to forcibly detach this float valve body 7 from the valve seat 6, so that the low temperature air and/or low temperature water will be discharged from the valve chamber 2.

The cylindrical hole 4A of the valve seat 6 constitutes an upstream portion of the discharge path 4. This cylindrical hole 4A includes a downstream large-diameter hole portion 4a, a slightly upstream converged hole portion 4b converged from the upstream end of the large diameter hole portion 4a toward the upstream side and an upstream small diameter portion 4c extending from the upstream end of the converged hole portion 4b to the valve opening, 6a.

The foreign object removing member 8 is configured such that in response to its threading-in operation into the threaded hole 10a formed in the valve case 5, the foreign object removing member 8 is advanced in the discharge path 4 to eventually penetrate the valve opening 6a. To this end, at the leading end of the foreign object removing member 8, there is formed a penetrating portion 8a in the form of a small diameter cylindrical portion which penetrates the valve opening 6a when the foreign object removing member 8 is advanced. Further, at an intermediate portion of the foreign object removing member 8, there is formed a threaded portion 8b having a thread for threaded engagement with the threaded hole 10a of the cylindrical holder member 10. Moreover, at the rear end of the foreign object removing member 6, there is formed an operation portion 8c operable from outside the valve case 5 with an operation tool such as a driver, a torque wrench, etc., for the threading-in operation and the threading-out operation.

The foreign object removing member 8 includes an advancement stopper 8d for restricting an advancing movement of the foreign object removing member 8 when the foreign object removing member 8 has been advanced to close a portion near the valve opening 6a. This advancement stopper 8d is comprised of an annular inclined stepped portion formed rearwardly of the penetrating portion 8a. The advancement stopper 8d, at its advanced position shown in FIG. 3, comes into watertight contact with the slightly upstream converged portion 4b of the valve seat cylindrical hole 4A.

The foreign object removing member 8 further includes a retraction stopper 8e for restricting a retracting movement of the foreign object removing member 8 when this member 8 has been retracted to close the portion of the wall of the valve case 5 penetrated by the foreign object removing member 8. This retraction stopper 8e is comprised of a flange portion formed forwardly of the threaded portion 8b. In operation, this retraction stopper 8e, when located at its retracted position shown in FIG. 2, comes into water-tight contact with the peripheral edge of the threaded portion 10a in the inner face of the well of the valve case 5.

That is to say, with this steam trap T, by a threading-in operation into the threaded hole 10a formed in the valve case 5, it is possible to obtain an advancing force at a low speed in advancing the foreign object removing member 8 in the discharge path 4.

Further, when the foreign object removing member 8 is located at the advanced position, the converged hole portion 4b of the valve seat cylindrical wall 4A is closed by the advancement stopper 8d. Hence, after completion of the advancing movement, it is possible to release an amount of condensed water W or the like naturally accumulated inside the valve chamber 2 due to adhesion of a foreign object S, from the maximally upstream side of the discharge path 4 to pass at one time this discharge path 4.

Moreover, when the foreign object removing member 8 is located at the retracted position, the well portion of the valve case 5 penetrated by the foreign object removing member 8 is closed by the retraction stopper 3e. Therefore, it is possible to effectively prevent reverse inflow of the discharged condensed water W into the portion penetrated by the foreign object removing member 8.

The outer diameter of the penetrating portion 8a is made slightly smaller than the inner diameter of the upstream small diameter hole portion 4c of the valve seat cylindrical hole 4A. Therefore, when the foreign object removing member 8 is advanced, the penetrating portion 8a penetrates the valve opening 6a, with the outer peripheral face of the penetrating portion 8a being in slidable contact with the inner peripheral face of the small diameter hole portion 4c, whereby any foreign object present at the small diameter hole portion 4c and/or the valve opening 6a can be effectively pushed out into the valve chamber 2.

FIG. 4 shows a relative arrangement set between an inner diameter R1 of the respective portion of the valve seat cylindrical hole 4A and an outer diameter R2 of the respective portion of the foreign object removing member 8. According to this relative arrangement, a minimal cross sectional area A1 of the annular discharge path 4 formed between the inner peripheral face of the valve seat cylindrical hole 4A and the outer peripheral face of the foreign object removing member 8 (i.e. the path cross sectional area of the effective discharge path) is greater than the aperture area of the valve opening 6a and the minimal width W1 of the discharge path 4 (i.e. the path width of the effective discharge path) is smaller than the inner diameter (diameter) of the valve opening 6a. This arrangement effectively ensures the discharge rate of the discharge path 4 when the foreign object removing member 8 is located at the retracted position.

Incidentally, for the purpose of advantage of effective prevention of clogging of foreign object S in the discharge path 4, the relative size between the inner diameter R1 of the respective portion of the valve seat cylindrical hole 4A and the outer diameter R2 of the respective portion of the foreign object removing member 8 should be set such that the minimal width W1 of the discharge path 4 is as approximate as possible to the inner diameter of the valve opening 6a.

Numeral 15 denotes an annular seal member formed of elastic material and interposed between the inner peripheral face of the cylindrical holder member 10 and the outer peripheral face of the foreign object removing member 8, at a rear portion of the threaded hole 10a of the cylindrical holder member 10.

Numeral 16 denotes a pressing member for pressing the seal member 15 in response to a threading-in operation to the rear portion of the cylindrical holder member 10. When this press member 16 presses the seal member 15, there is retained a water-tight state between the cylindrical holder member 10 and the foreign object removing member 8.

Incidentally, in the instant embodiment, the foreign object removing member 8 is formed integrally of metal material. Therefore, in response to a threading-in operation to the operation portion 8c, the penetrating portion 8a is rotated about an axis P.

Further, the converged hole portion 4b of the valve seat cylindrical hole 4A corresponds to a "guiding means" for guiding the foreign object removing member 8 toward the valve opening 6a. Referring more particularly to this converged hole portion 4b, when the penetrating portion of the foreign object removing member 8a during its advancing movement is off the direction of the axis P, the converged hole portion guides the penetrating portion 8a toward the valve opening 6a, with the penetrating portion 8a or the advancement stopper 8d being placed aside its inner peripheral face.

Next, there will be described an example of the method of cleaning the steam trap T having the above-described construction.

FIG. 5 illustrates a condition wherein valve performance has been deteriorating as a result of adhesion of foreign object S to the valve opening 6a and the perimeter of the valve opening 6a during the normal use of the steam trap T with the foreign object removing member 8 being located a its retracted position. In this, inside the valve chamber 2, there has accumulated a certain amount of condensed water W, due to the adhesion of foreign object S to the valve opening 6a and the perimeter of the valve opening 6a First, as shown in FIG. 6, the operation portion 8c of the foreign object removing member 8 is threaded-in (specifically, rotational operation about the axis P) with an operation tool, thereby to advance the foreign object removing member 8 to the advanced position where the advancing movement is restricted by the advancement stopper 8d, thus causing the penetrating portion 8a to penetrate the valve opening 6a.

In the course of the above, the adhered foreign object S at the valve opening 6a is pushed out into the valve chamber 2 by the advancing penetrating portion 8a. Further, by the penetrating portion 8a, a portion of the adhered foreign object S present around the valve opening 6a too is removed or peeled off to fall into the valve chamber 2 together with the adhered foreign object S at the valve opening 6a.

Next, at this advanced position, by setting the foreign object removing member 8 to standby, the condensed water W is allowed to be further accumulated to a water level indicated by a dotted chain line in FIG. 6, inside the valve chamber 2, with the discharge path 4 being closed by the advancement stopper 8d.

Lastly, the operation portion 8c of the foreign object removing member 8 is threaded-out by the operation tool, that is, the portion is rotated about the axis P in the opposite direction to the direction of the threading-in operation, so as to retract the foreign object removing member 8 to the retracted position where the retraction movement is restricted by the retraction stopper 8e.

In the course of the above retraction movement, when the closure of the discharge path 4 by the advancement stopper 8d is released thereby to open the discharge path 4, the amount of condensed water W stored inside the valve chamber 2 is released to flow at once into the discharge path 4 through the valve opening 6a, so that this flushed condensed water W will discharge the foreign object S which was not removed completely by the advancement movement of the foreign object removing member 8 and/or the foreign object S removed and then discharged into the valve chamber 2 by the advancement movement of the foreign object removing member 8 and for the foreign object S adhered to the perimeter of the valve opening 6a.

[Other Embodiments]

Next, other embodiments will be described respectively.

In the foregoing embodiment, the advancement stopper 8d and the retraction stopper 8e are provided as separate members. Instead, it is possible to adapt the retraction stopper 8e to function also as the advancement stopper for restricting advancement movement of the foreign object removing member 8 when the foreign object removing member 8 has been advanced to the advanced position.

That is to say, as shown in FIG. 7 and FIG. 8 for instance, instead of providing the advancement stopper 8d, the retraction stopper 8e is formed of a flange portion formed forwardly of the threaded portion 3b. With this retraction stopper 8e in operation, at its retracted position shown in. FIG. 7, the stopper 8e comes into water-tight condition with the peripheral edge of the threaded hole 10a in the wall inner face of the valve case 5. Further, with this retraction stopper 8e, at its advanced position shown in FIG. 8, the retraction stopper 8e comes into water-tight contact with the opening peripheral edge of the downstream large-diameter portion 4a of the valve seat cylindrical hole 4A.

The specific shapes and the specific constructions of the advancement stopper and the retraction stopper are not limited to those described in the foregoing embodiment, but may vary in many ways. For instance, in the foregoing embodiment, the advancement stopper 8d is configured such that the stopper 8d closes the portion adjacent the valve opening 6a of the discharge path 4 when the foreign object removing member 8 has advanced. Instead, the advancement stopper 8d may be modified to close the valve opening 6a or any other portion of the discharge path 4 when the foreign object removing member 8 has advanced. Further, the advancement stopper 8d may be configured not to close the discharge path 4, but only to constrict or limit the discharge rate of the discharge path 4.

The specific construction of the foreign object removing member 8 is not limited to the one described in the foregoing embodiment, but may vary in many ways. For instance, in the foregoing embodiment, the foreign object removing member 8, when located at the advanced position, is configured to penetrate the valve opening 6a. However, the penetration of the valve opening 6a is not absolutely needed. The shape, length, etc. of the foreign object removing member 8 may vary, in accordance with the discharging target portion of the discharge path 4.

For instance, in the foregoing embodiment, the penetrating portion 8a of the foreign object removing member 8 is configured to be rotatable about the axis P in response to a threading-in operation. Instead, the penetrating portion 8a may be configured to be rotatable along a direction other than being about the axis P, in response to a threading-in operation. Further, the penetrating portion 8a may be configured not to be rotatable at all in response to a threading-in operation.

As an improvement of the steam trap T shown in the foregoing embodiment, it is possible e.g. to provide the valve case 5 with a protective member for protecting the portion of the foreign object removing member 8 located outside the valve case 5 against a shock.

Namely, as shown in FIG. 9, for instance, a cylindrical protective cap 17 having an upper opening portion 17a and a lower opening portion 17b may be arranged to be engaged over the outer peripheral face of the cylindrical holder member 10. With this protective cap 17, when the foreign object removing member 8 is located at the retracted position, the open face of the lower opening 17b is located rearwardly of the operation portion 8c of the foreign object removing member 8. With this, it is possible to allow the operation on the operation portion 8c of the foreign object removing member 8 through the lower opening 17b of the protective cap 17. Further, it is also possible to effectively avoid application of a shock (in particular, along the direction normal to the axis P direction) to the portion of the foreign object removing member 8 located outside the valve case 5. Therefore, it is possible to effectively avoid damage to the foreign object removing member 8 due to such shock or such inconvenience as inadvertent change in the advancing posture of the foreign object removing member 8.

Further, as an improvement of the steam trap T described in the foregoing embodiment, it is possible to arrange such that the foreign object removing member 8, the seal member 15, the cylindrical holder member 10 incorporating the pressing member 16, the closing member for closing the attaching portion of the case lid member 11 for attaching the cylindrical holder member 10 ma be selectively replaceable.

In the foregoing embodiment, the float valve body 7 is fowled as a hollow spherical shape. Instead, the shape of the float valve body 7 may vary in many ways, such as a hollow rectangular solid body, a partial spherical body with a portion of its outer surface being open, a partial rectangular body, and so on.

In the foregoing embodiment, when the float valve body 7 is afloat in the condensed water W inside the valve chamber 2, the valve body 7 is lowered in association with lowering of the condensed water level inside the valve chamber 2 to be seated on the valve seat 6 provided on the lower side of the valve chamber 2 and also the valve body Tis lifted up in association with rising of the condensed water level inside the valve chamber 2 to be detached from the valve seat 6. Instead of this, alternative arrangement is possible such that when the float type valve body 7 is afloat in the condensed water W inside the valve chamber 2, in association with introduction of steam A inside the valve chamber 2 and subsequent introduction of the steam A into the valve body, the valve body moves up in the condensed water W to be seated upon a valve seat provided on an upper side of the valve chamber 2 and in association with e.g. condensation of the steam A introduced into the valve body, the valve body moves downward in the condensed water W to be detached from the valve seat.

In the foregoing embodiment, the opening/closing means is configured such that the valve opening is closed with the outer surface of the float member (so-called free float type construction). Instead, the opening/closing means may be configured such that the valve opening is closed with a member constructed as a valve opening opening/closing member operably connected to the float member via a link mechanism or the like (so-called lever float type construction).

The present invention is applicable to any float valve apparatus such as various types of steam traps, air traps, etc., having a valve chamber for receiving gas and liquid through an inlet pipe, a discharge path communicating with a discharge pipe, a valve chamber defining and forming therein said valve chamber and said discharge path, a valve opening for opening said discharge path to said valve chamber opening/closing means for opening/closing said valve opening in association with a movement of a float member floating in an amount of liquid received in said valve chamber, and a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case

DESCRIPTION OF REFERENCE MARKS

Figure 1:
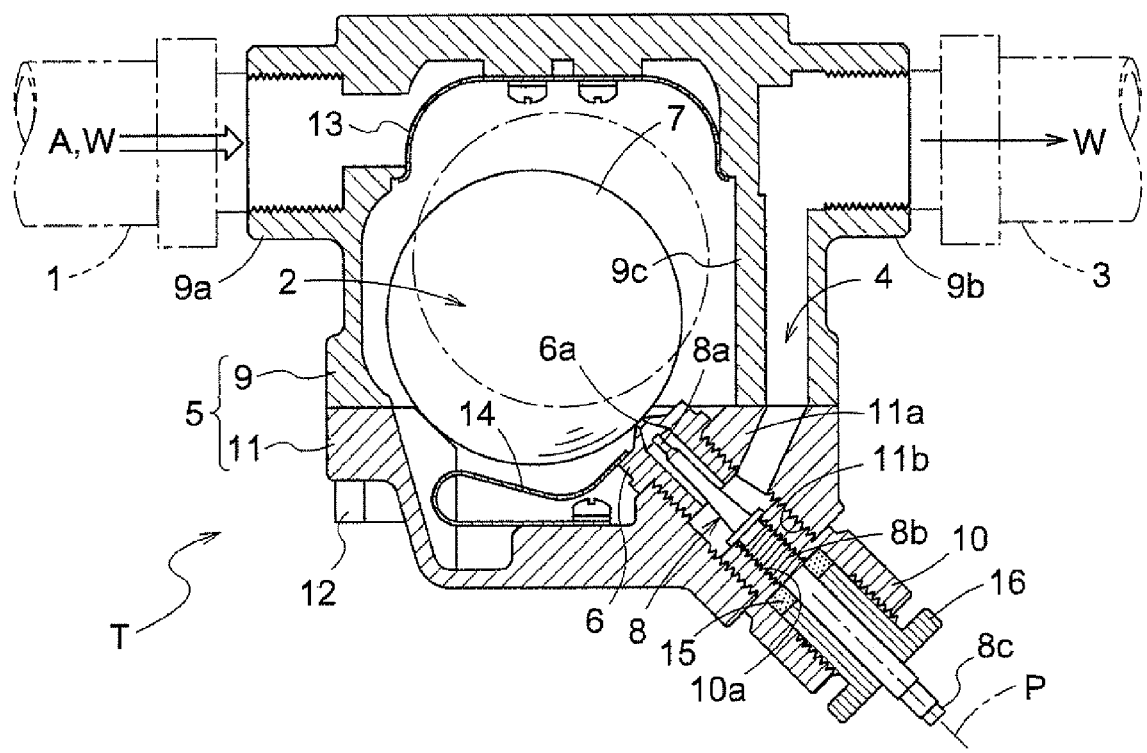
[FIG. 1] a construction view of a float valve apparatus according to the present invention,
[FIG. 2] a construction view of principal portions of the float valve apparatus according to the present invention,
[FIG. 3] a construction view of principal portions of the float valve apparatus according to the present invention,
[FIG. 4] a section taken along line IV-IV in FIG. 2,
[FIG. 5] an explanatory view illustrating a use of the float valve apparatus according to the present invention,
[FIG. 6] an explanatory view illustrating a use of the float valve apparatus according to the present invention.
Figure 2:
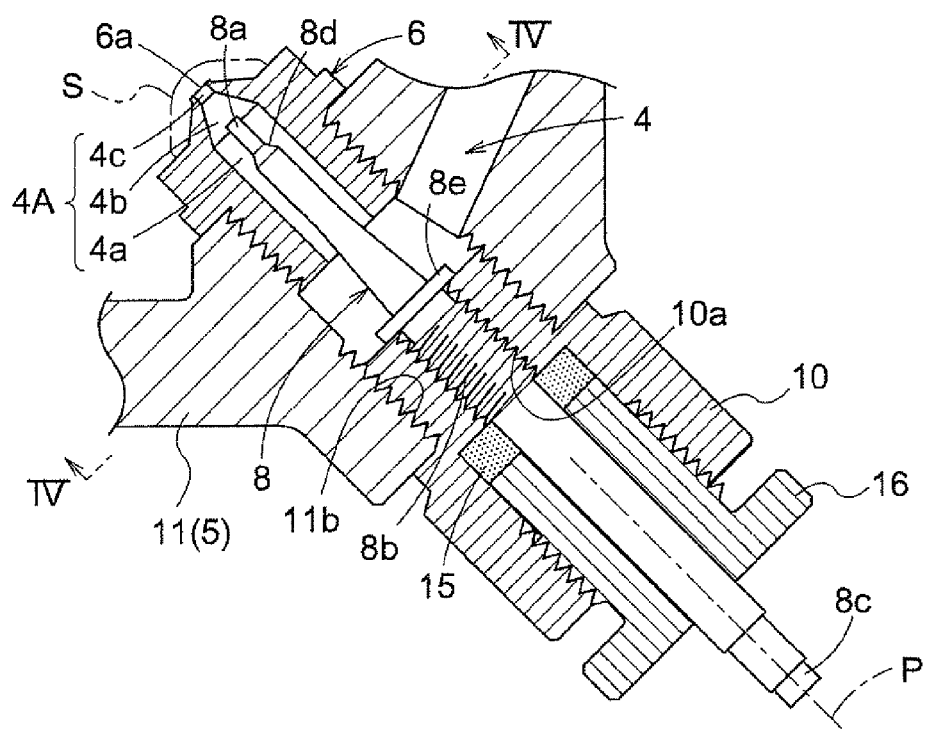
Figure 3:
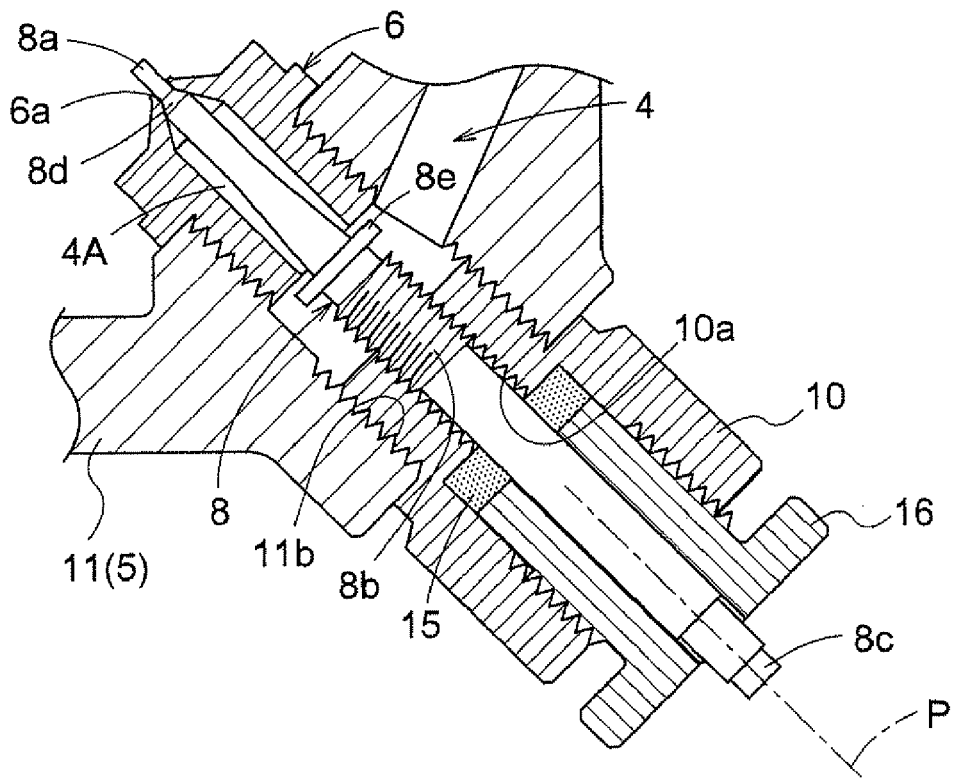
Figure 4:
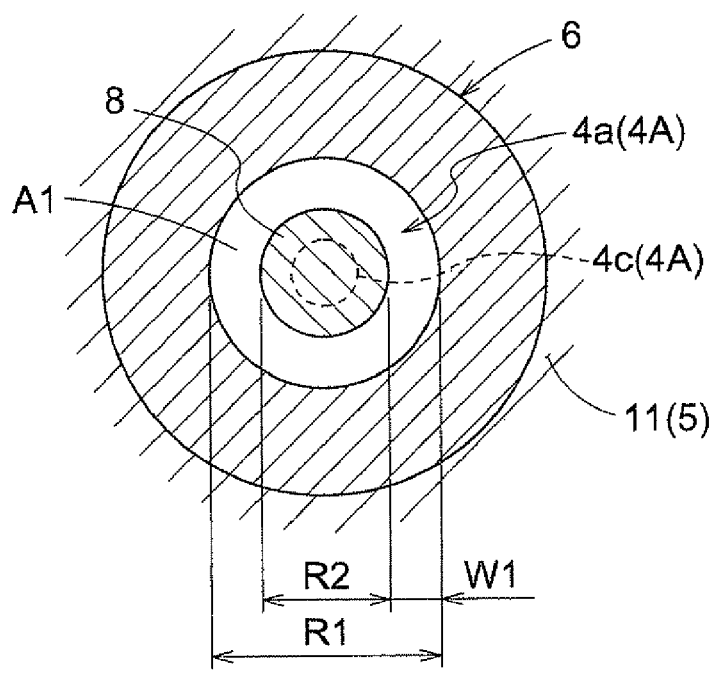
Figure 5:
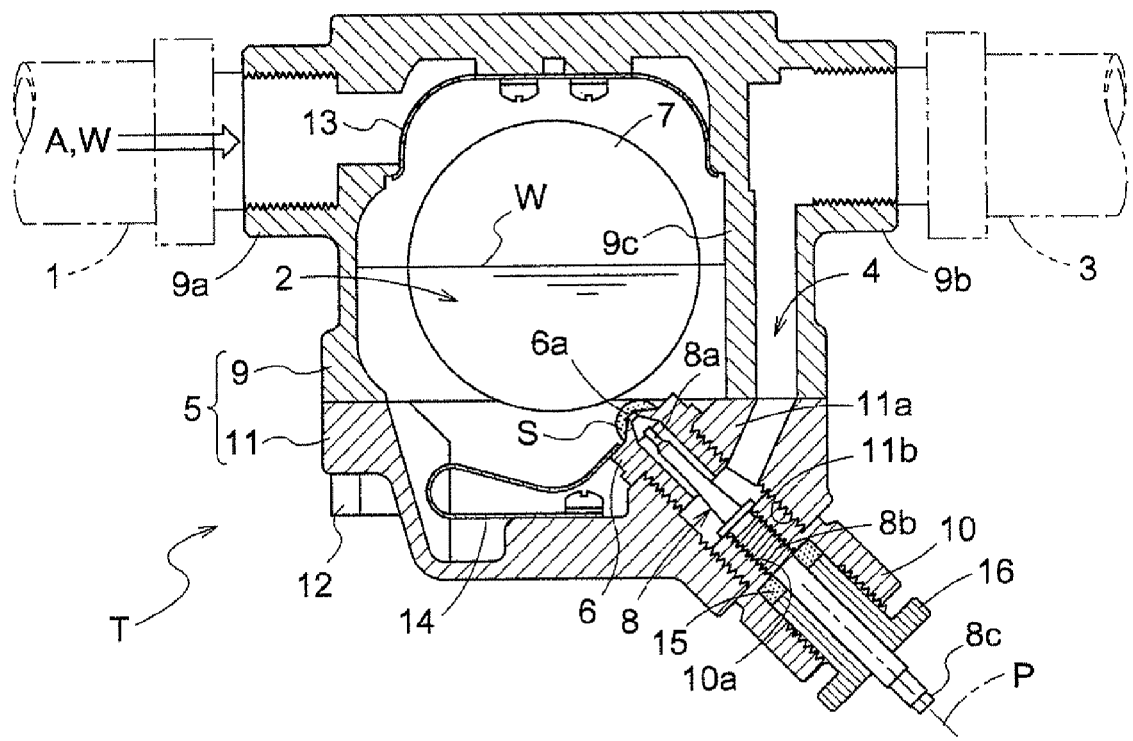
Figure 6:
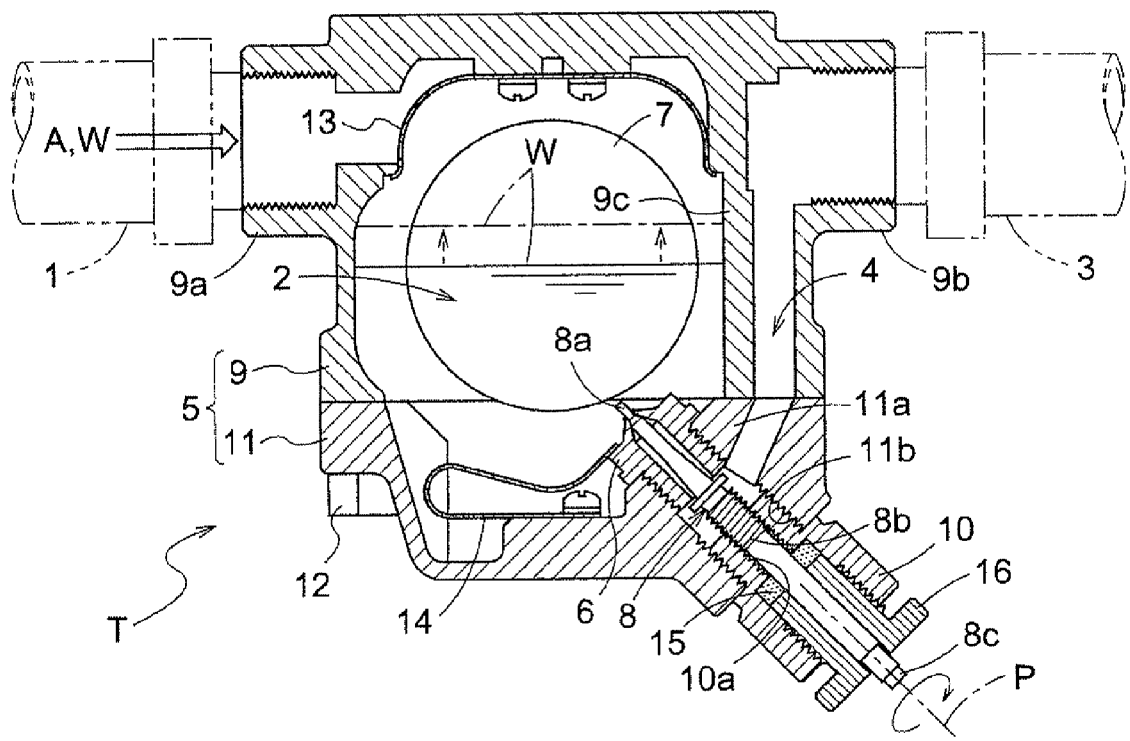
Figure 7:
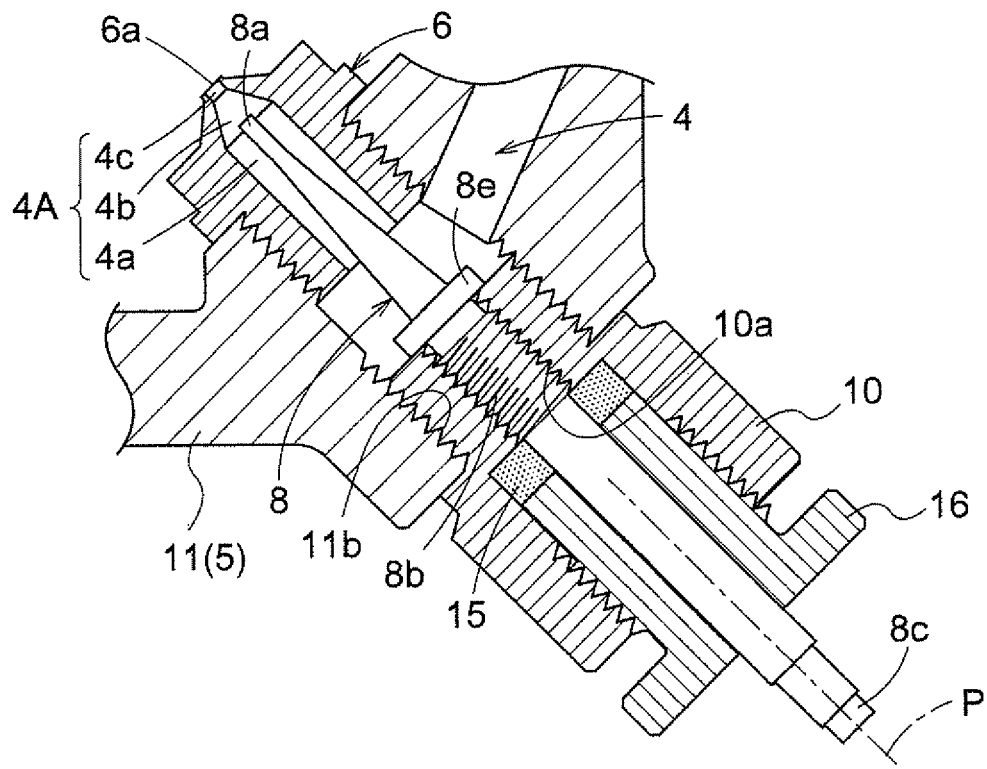
[FIG. 7] a construction view of principal portions of a float valve apparatus according to a further embodiment of the present invention,
[FIG. 8] a construction view of principal portions of a float valve apparatus according to a further embodiment of the present invention,
[FIG. 9] a construction view of principal portions of a float valve apparatus according to a further embodiment of the present invention, and
[FIG. 10] a construction view of a conventional float valve apparatus.
Figure 8:
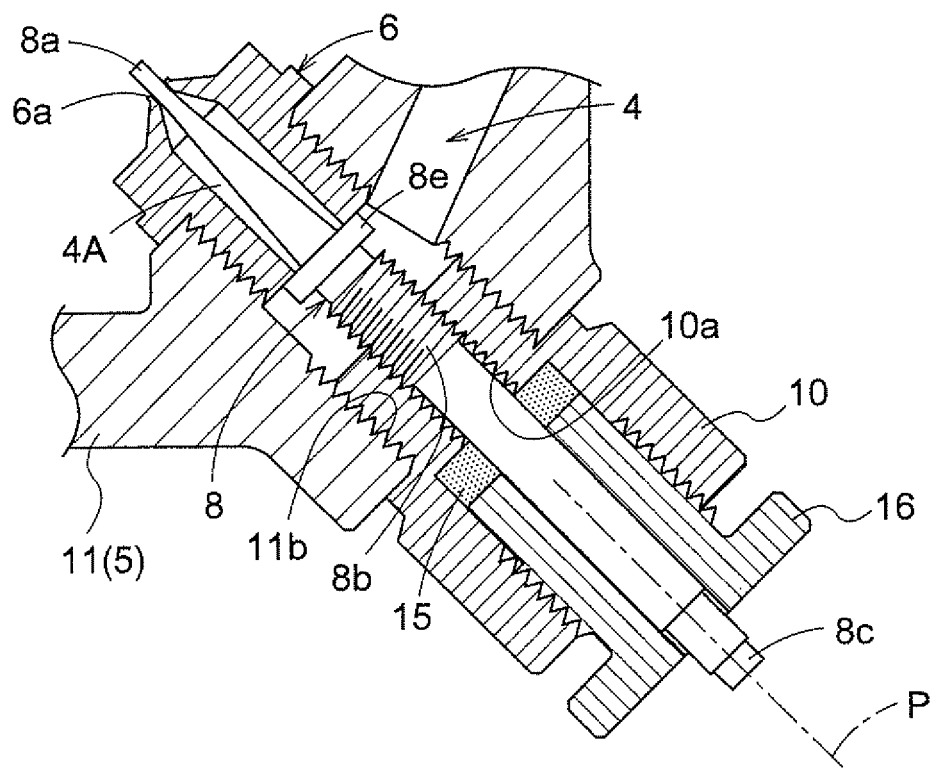
Figure 9:
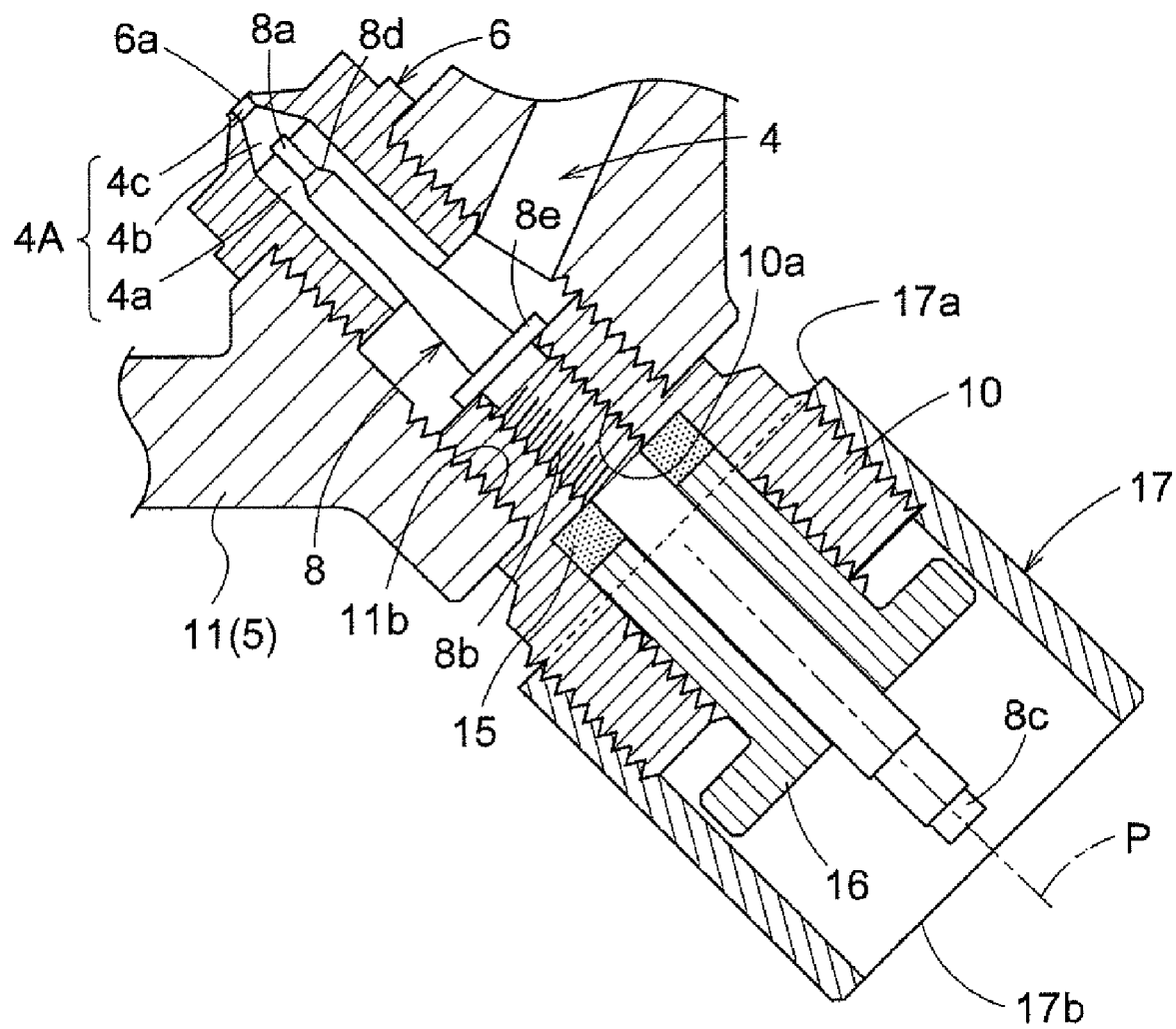
Figure 10:
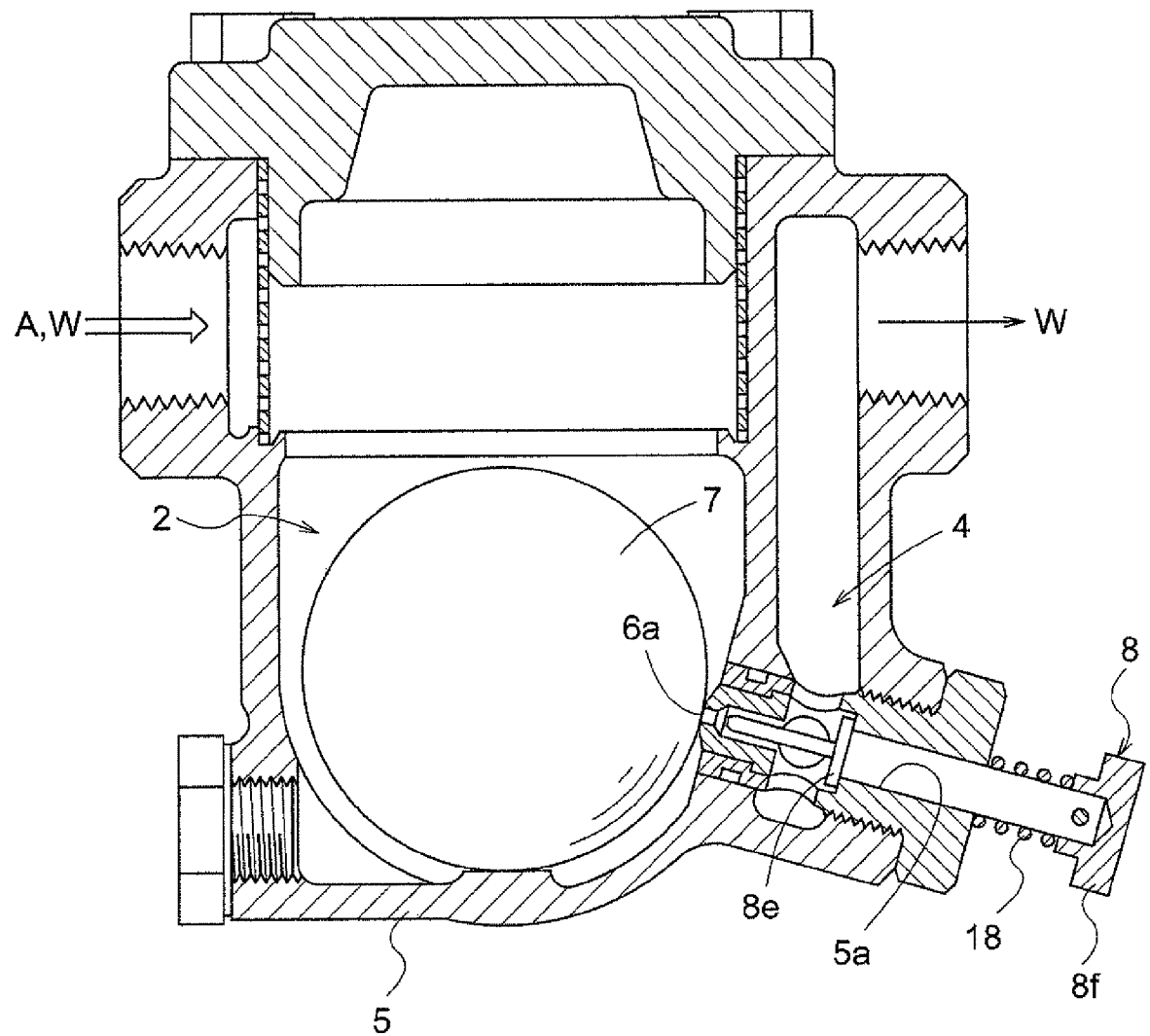

A: gas (steam)
W: liquid (condensed water)
S: foreign object
1: inlet pipe
2: valve chamber
3: discharge pipe
discharge path
4b: guiding means (converged hole portion)
5: valve case
6a: valve opening
6: valve seat
7: float member (float valve body)
8: foreign object removing member
8a: leading end (penetrating portion)
8d: advancement stopper
8e: retraction stopper

The invention claimed is:
1. A float valve apparatus comprising:
a valve chamber for receiving gas and liquid through an inlet pipe;
a discharge path communicating with a discharge pipe;
a valve case defining and forming therein said valve chamber and said discharge path;
a valve opening for opening said discharge path to said valve chamber;
opening/closing means for opening/closing said valve opening in association with a movement of a float member floating in an amount of liquid received in said valve chamber; and
a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;
wherein said foreign object removing member is caused to advance in a cylindrical hole constituting an upstream portion of said discharge path to penetrate said valve opening, in response to a threading-in operation of the foreign object removing member to a threaded portion formed in said valve case,
wherein said cylindrical hole includes a downstream large-diameter hole portion, a slightly upstream converged hole portion converged from an upstream end of the large-diameter hole portion toward an upstream side, and an upstream small diameter portion extending from an upstream end of the converged hole portion to the valve opening,
wherein a leading end of the foreign object removing member is rotatable about the axis of said cylindrical hole in response to said threading-in operation, wherein, at the leading end of the foreign object removing member, there is formed a penetrating portion which penetrates the valve opening when the foreign object removing member is advanced, wherein said foreign object removing member includes an advancement stopper which comes into water-tight contact with said converged hole portion along an inner peripheral face thereof for restricting an advancing movement of the foreign object removing member when the foreign object removing member is advanced, said advancement stopper being comprised of an annular inclined stepped portion, wherein said foreign object removing member further includes a tapered portion which is formed downstream of said advancement stopper and which has a diameter progressively increased toward a downstream side, and wherein said tapered portion has a tapered shape such that an annular effective discharge path portion thereof having a path width smaller than the diameter of said valve opening is formed between its tapered outer peripheral face and an inner peripheral face of said cylindrical hole and said path width of said effective discharge path portion becomes smaller as said foreign object removing member is advanced from the retracted position thereof.

2. The float valve apparatus according to claim 1, wherein a valve seat forming said valve opening is provided in said valve chamber; and said opening/closing means comprises an arrangement that said valve opening is opened/closed in association with detaching/seating of said float member as floating in liquid received in said valve chamber, from/to said valve seat.

3. The float valve apparatus according to claim 1, wherein the tapered shape of said tapered portion is such that when said foreign object removing member is located at the retracted position, a path cross sectional area of said effective discharge path is greater than an aperture area of said valve opening.

4. The float valve apparatus according to claim 2, wherein the tapered shape of said tapered portion is such that when said foreign object removing member is located at the retracted position, a path cross sectional area of said effective discharge path is greater than an aperture area of said valve opening.

5. The float valve apparatus according to claim 1, further comprising a retraction stopper for restricting a retracting movement of said foreign object removing member while closing a portion of a wall portion of the valve case penetrated by the foreign object removing member.

6. The float valve apparatus according to claim 2, further comprising a retraction stopper for restricting a retracting movement of said foreign object removing member while closing a portion of a wall portion of the valve case penetrated by the foreign object removing member.

7. The float valve apparatus according to claim 3, further comprising a retraction stopper for restricting a retracting movement of said foreign object removing member while closing a portion of a wall portion of the valve case penetrated by the foreign object removing member.

8. A method of cleaning a float valve apparatus comprising the steps of:

providing a float valve apparatus comprising:
a valve chamber for receiving gas and liquid through an inlet pipe;
a discharge path communicating with a discharge pipe;
a valve case defining and forming therein said valve chamber and said discharge path;
a valve opening for opening said discharge path to said valve chamber;
opening/closing means for opening/closing said valve opening in association with a movement of a float member floating in an amount of liquid received in said valve chamber; and
a foreign object removing member for removing a foreign object in said discharge path in association with an advancing movement of the foreign object removing member toward said valve opening in said discharge path, said foreign object removing member being movable to advance/retract in said discharge path in response to an operation from outside said valve case;

wherein said foreign object removing member is caused to advance in a cylindrical hole constituting an upstream portion of said discharge path to penetrate said valve opening, in response to a threading-in operation of the foreign object removing member to a threaded portion formed in said valve case, wherein said cylindrical hole includes a downstream large-diameter hole portion, a slightly upstream converged hole portion converged from an upstream end of the large-diameter hole portion toward an upstream side, and an upstream small diameter portion extending from an upstream end of the converged hole portion to the valve opening, wherein a leading end of the foreign object removing member is rotatable about the axis of said cylindrical hole in response to said threading-in operation, wherein, at the leading end of the foreign object removing member, there is formed a penetrating portion which penetrates the valve opening when the foreign object removing member is advanced, wherein said foreign object removing member includes an advancement stopper which comes into water-tight contact with said converged hole portion along an inner peripheral face thereof for restricting an advancing movement of the foreign object removing member when the foreign object removing member is advanced, said advancement stopper being comprised of an annular inclined stepped portion, wherein said foreign object removing member further includes a tapered portion which is formed downstream of said advancement stopper and which has a diameter progressively increased toward a downstream side, and wherein said tapered portion has a tapered shape such that an annular effective discharge path portion thereof having a path width smaller than the diameter of said valve opening is formed between its tapered outer peripheral face and an inner peripheral face of said cylindrical hole and said path width of said effective discharge path portion becomes smaller as said foreign object removing member is advanced from the retracted position thereof;

advancing said foreign object removing member toward said valve opening to cause said penetrating portion to penetrate said valve opening;

allowing liquid to be received and reserved within the valve chamber by keeping said foreign object removing member standby under the above condition; and subsequently extending or opening said discharge path by retracting said foreign object removing member, thereby allowing the liquid reserved in the valve chamber to pass the discharge path from the valve opening.

9. The method of claim 8, wherein a valve seat forming said valve opening is provided in said valve chamber; and said opening/closing means comprises an arrangement that said valve opening is opened/closed in association with detaching/seating of said float member as floating in liquid received in said valve chamber, from/to said valve seat.

10. The method of claim 8, wherein the tapered shape of said tapered portion is such that when said foreign object removing member is located at the retracted position, a path cross sectional area of said effective discharge path is greater than an aperture area of said valve opening.

11. The method of claim 8, wherein the float valve apparatus further comprises a retraction stopper for restricting a retracting movement of said foreign object removing member while closing a portion of a wall portion of the valve case penetrated by the foreign object removing member.

* * * * *